(12) United States Patent
Pheterson

(10) Patent No.: US 10,159,263 B2
(45) Date of Patent: Dec. 25, 2018

(54) APPARATUS AND METHODS FOR MAKING FROZEN BANANA FOOD PRODUCTS

(71) Applicant: Totally Bananas Inc., Davie, FL (US)

(72) Inventor: Charles J. Pheterson, Davie, FL (US)

(73) Assignee: Totally Bananas, LLC, Davie, FL (US)

( * ) Notice: Subject to any disclaimer, the term of this patent is extended or adjusted under 35 U.S.C. 154(b) by 216 days.

(21) Appl. No.: 14/375,779

(22) PCT Filed: Jan. 31, 2013

(86) PCT No.: PCT/US2013/023957
§ 371 (c)(1),
(2) Date: Jul. 30, 2014

(87) PCT Pub. No.: WO2013/116410
PCT Pub. Date: Aug. 8, 2013

(65) Prior Publication Data
US 2015/0024098 A1    Jan. 22, 2015

Related U.S. Application Data

(60) Provisional application No. 61/624,386, filed on Apr. 15, 2012, provisional application No. 61/593,560, filed on Feb. 1, 2012.

(51) Int. Cl.
*A23P 30/10*    (2016.01)
*A23G 9/26*    (2006.01)
(Continued)

(52) U.S. Cl.
CPC .......... *A23G 9/42* (2013.01); *A23G 9/04* (2013.01); *A23G 9/083* (2013.01); *A23G 9/221* (2013.01);
(Continued)

(58) Field of Classification Search
CPC .............................. A23G 9/083; A23G 9/221
See application file for complete search history.

(56) References Cited

U.S. PATENT DOCUMENTS

| | | | |
|---|---|---|---|
| 2,647,838 A | 8/1953 | Stone | |
| 3,233,562 A * | 2/1966 | Nakamura | A23G 3/0252 249/141 |

(Continued)

FOREIGN PATENT DOCUMENTS

| | | | |
|---|---|---|---|
| KR | 2001016557 A1 * | 5/2001 | A23G 9/00 |
| WO | 2009068428 A1 | 6/2009 | |

(Continued)

OTHER PUBLICATIONS

Kitchn, Summer Treat: Best Popsicle Molds, Jun. 2008, Accessed: Sep. 1, 2016. <http://www.thekitchn.com/summer-treat-best-popsicle-mol-53409>.*

(Continued)

*Primary Examiner* — Viren A Thakur
*Assistant Examiner* — Thanh H Nguyen
(74) *Attorney, Agent, or Firm* — Gerald F. Dudding; GFD Patents LLC

(57) ABSTRACT

An apparatus and method for making frozen food products from a fruit puree, i.e. a flowable banana meat or a flowable blend of fruit meat and other edible ingredients. A composition that includes peeled bananas and at least one antioxidant may be mixed in a mixing device at ambient temperature and under less than one atmosphere of pressure, forming the puree. The temperature of the puree is reduced to a semi-frozen state by passing the puree through a heat exchanger. The semi-frozen puree is then formed into food products with a pre-determined volume, shape, and weight by a molding or extrusion process. Sticks, if desired, may be inserted, and the shaped puree is then frozen to solidified cores. The solidified cores may be coated with chocolate and treated with other edible toppings and then packaged.

30 Claims, 16 Drawing Sheets

(51) Int. Cl.
*A23G 9/04* (2006.01)
*B29C 33/38* (2006.01)
*A23G 9/42* (2006.01)
*A23G 9/22* (2006.01)
*A23G 9/50* (2006.01)
*A23G 9/08* (2006.01)
*A23G 9/48* (2006.01)
*B29C 33/42* (2006.01)
*A23L 19/00* (2016.01)
*B29L 31/00* (2006.01)

(52) U.S. Cl.
CPC ............... *A23G 9/26* (2013.01); *A23G 9/48* (2013.01); *A23G 9/503* (2013.01); *A23L 19/09* (2016.08); *A23P 30/10* (2016.08); *B29C 33/38* (2013.01); *B29C 33/42* (2013.01); *A23V 2002/00* (2013.01); *B29K 2905/08* (2013.01); *B29K 2995/0094* (2013.01); *B29L 2031/7739* (2013.01)

(56) References Cited

U.S. PATENT DOCUMENTS

| | | | |
|---|---|---|---|
| 4,021,583 A | 5/1977 | Arden | |
| 4,273,792 A * | 6/1981 | Johnson | A23G 9/52 426/482 |
| 4,335,155 A | 7/1982 | Blake | |
| 4,675,195 A * | 6/1987 | Holton | A23L 29/238 426/100 |
| 4,851,247 A | 7/1989 | Greenhouse et al. | |
| 5,098,731 A | 3/1992 | Fedpausch | |
| 5,861,183 A | 1/1999 | Feldpausch | |
| 6,228,412 B1 | 5/2001 | Groux et al. | |
| 6,368,654 B1 | 4/2002 | Evans et al. | |
| 6,432,466 B2 | 8/2002 | Brake et al. | |
| 7,465,468 B1 | 12/2008 | Cheney et al. | |
| 2005/0103910 A1 | 5/2005 | Zweben | |
| 2008/0008791 A1 | 1/2008 | Aldred et al. | |
| 2010/0159112 A1 | 6/2010 | Madsen et al. | |

FOREIGN PATENT DOCUMENTS

| | | | | |
|---|---|---|---|---|
| WO | WO 2010069727 A1 * | 6/2010 | ............... | A23G 9/14 |
| WO | WO-2010069727 A1 * | 6/2010 | ............... | A23G 9/14 |

OTHER PUBLICATIONS

Russell, Stabilizers in Ice Cream, Ice Cream Geek, Sep. 2009, Accessed: Sep. 1, 2016 <http://www.icecreamgeek.com/?p=664>.*
Gowen, Banana and Plantains, Springer Science 1995, p. 487-489.*
Definition of Room Temperature, yourdictionary.com. Captured Nov. 30, 2010 <https://web.archive.org/web/20101130075542/http://www.yourdictionary.com/room-temperature>.*

* cited by examiner

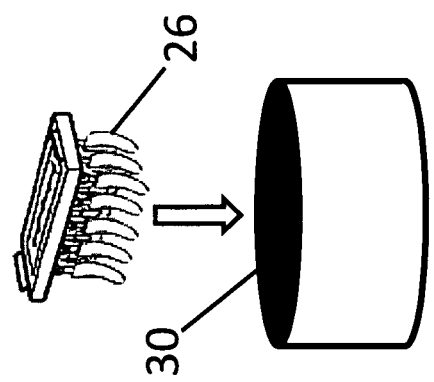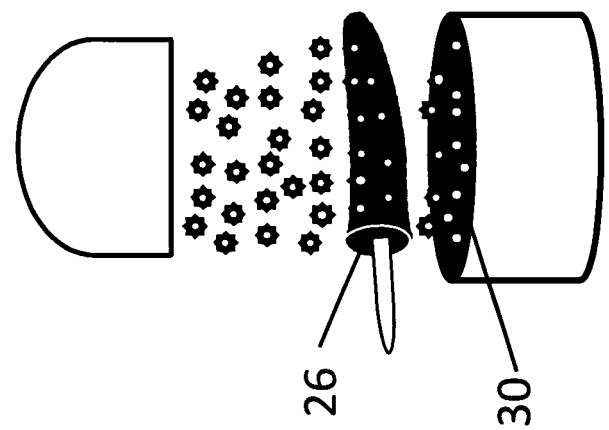
Fig. 10

APPARATUS AND METHODS FOR MAKING FROZEN BANANA FOOD PRODUCTS

I. FIELD OF THE INVENTION

The present invention relates generally to an apparatus and method for making frozen food products from a fruit puree. More specifically, the present invention relates to an apparatus and method for making frozen food products from a fruit puree.

2. BACKGROUND

The frozen novelty business is a multi-billion dollar industry. The category of better-for-you products is a rapidly growing segment of the overall novelty market. Products made from portions of frozen bananas are nutritious foods and gaining popularity. They may be eaten on a stick or from a container. U.S. Pat. No. 4,948,614, U.S. Pat. No. 6,109,056, and US Patent Application 2010/0119683, to Feldpausch, disclose preparation of non-dairy frozen confection products based on a banana puree. This art teaches a product with taste and mouth feel similar to soft serve ice cream, frozen yogurt and Dole Whip™, which are best served in a cone, cup, or bowl. To form a soft-serve texture, these inventions intentionally whip air into the puree as is common practice with ice cream production. This whipping process is referred to as overrun.

One disadvantage of the frozen fruit composition of Feldpausch is that it is best suited for immediate consumption. That method, therefore, is ill-suited mass production of pre-packaged products. Therefore, there is a need for improved apparatus(s) and methods for mass production of frozen banana products.

SUMMARY OF THE INVENTION

There is a need for an apparatus and method for making frozen food products from a fruit puree, without oxidation or browning.

A first aspect of the present invention provides a method for making frozen food products. The method comprises providing a puree formed under less than one atmosphere of pressure and passing the puree through a scraped surface heat exchanger. The heat exchanger may be adapted to cool the puree so the puree may be cooled to a workable temperature range for making frozen food products having a pre-determined volume, shape, and weight. The workable temperature range for molding the puree may be from about 12° F. to about 22° F., and the workable temperature range for extruding the puree is from about 0° F. to about 12° F. The process may be done with ingredients that include banana meat that has not become meal through a de-watering process, and at least one antioxidant.

A second aspect of the present invention provides a method for making frozen food products. First a composition made from peeled bananas and at least one antioxidant at ambient temperature may be provided. Next the peeled bananas and antioxidants are inserted into a mixing device capable of creating a puree under less than one atmosphere of pressure. The mixing device may be closed and the air pressure in the mixing device may be reduced to less than one atmosphere. The mixing device may be activated, creating an oxidation resistant puree. The oxidation-resistant puree may be conveyed through a heat exchanger to a doser. The temperature of the puree may be reduced to a workable temperature range to about 12° F. or higher. The doser then doses the oxidation-resistant puree into molds.

A third aspect of the present invention provides a method for making frozen food products. A composition with peeled bananas and at least one antioxidant at ambient temperature is provided. The composition may be inserted into a mixing device capable of creating a puree under less than one atmosphere of pressure. The mixing device may be then closed and the air pressure in the mixing device may be reduced to less than one atmosphere. The mixing device may be activated to form an oxidation resistant puree. The oxidation resistant puree may be conveyed to a heat exchanger. The heat exchanger may be adapted to cool the puree so the puree may be cooled to a workable temperature range for making frozen food products having a pre-determined volume, shape, and weight from extrusion. The workable temperature range for extruding the puree may be from about 0° F. to about 12° F. The oxidation-resistant puree may then be conveyed into an extruder.

A fourth aspect of the present invention provides an apparatus for making frozen food products, comprising: a means for forming a puree of a composition that includes banana meat and at least one antioxidant, wherein the means includes a vacuum pump to reduce the pressure within a mixing bowl of the mixing device, a blanket of inert gas, and combinations thereof; and a means for cooling the puree so the puree may be cooled to a workable temperature range for making frozen food products having a pre-determined volume, shape, and weight, wherein the workable temperature range for molding the puree may be from about 12° F. to about 22° F., and the workable temperature range for extruding the puree may be from about 0° F. to about 12° F.

A fifth aspect of the present invention provides a banana-shaped mold that facilitates the production of frozen food products having a pre-determined volume, shape, and weight wherein tapered walls of the mold form a fill area that extends from the open end to the other end of the mold, wherein the other end of the mold may be closed, and wherein the open end of the mold may be the widest cross-section of the mold.

BRIEF DESCRIPTION OF THE FIGURES

The features of the invention are set forth in the appended claims. The invention itself, however, will be best understood by reference to the following detailed description of an illustrative embodiment when read in conjunction with the accompanying drawings, wherein:

FIG. 10 depicts the frozen cores being dipped in a molten coating and toppings applied, in accordance with embodiments of the present invention.

DETAILED DESCRIPTION OF THE EMBODIMENTS OF THE INVENTION

Definitions

Figure 1:
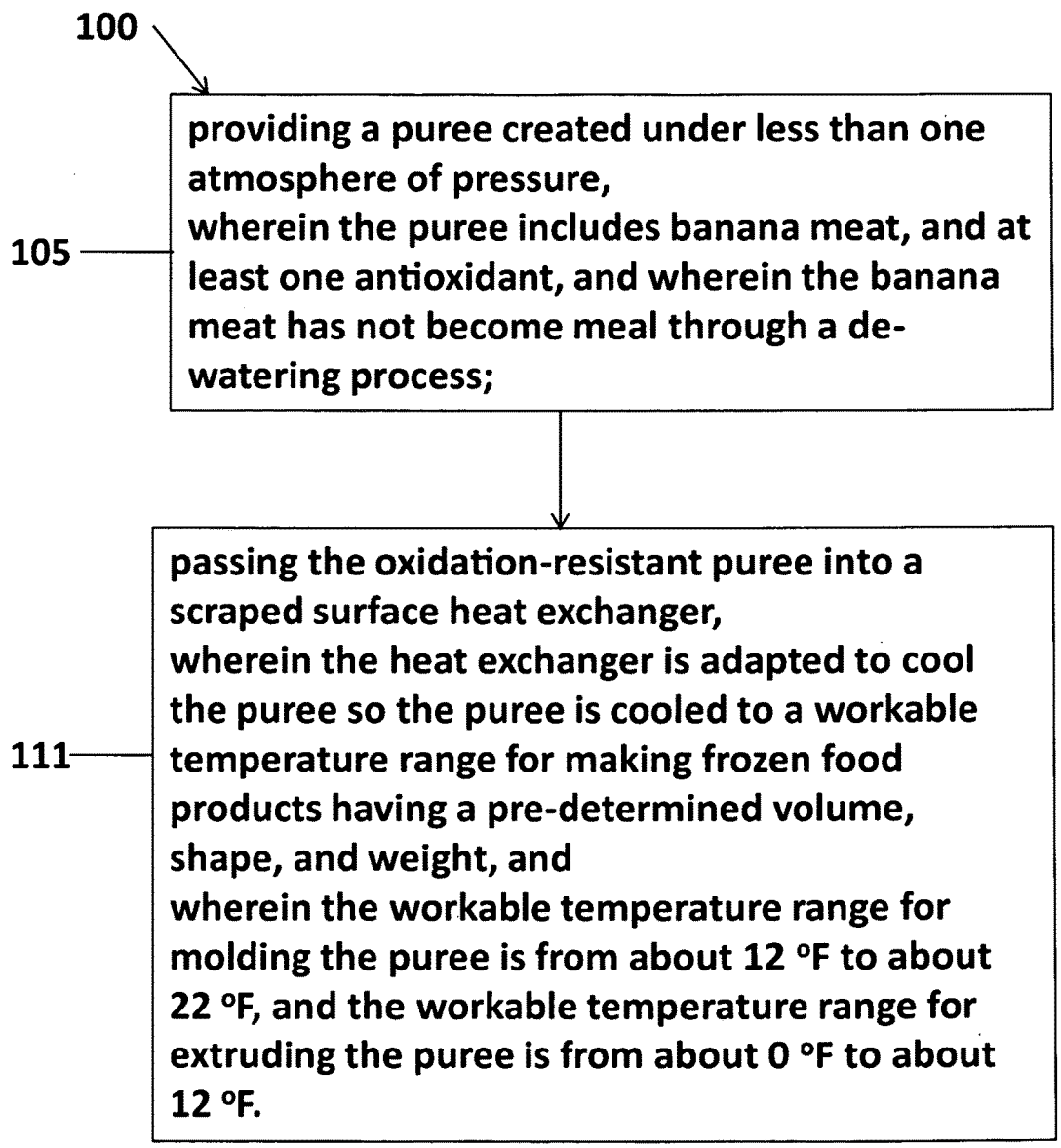
FIG. 1 depicts a flow chart illustrating a method for making frozen food products, in accordance with embodiments of the present invention.
Figure 2A:
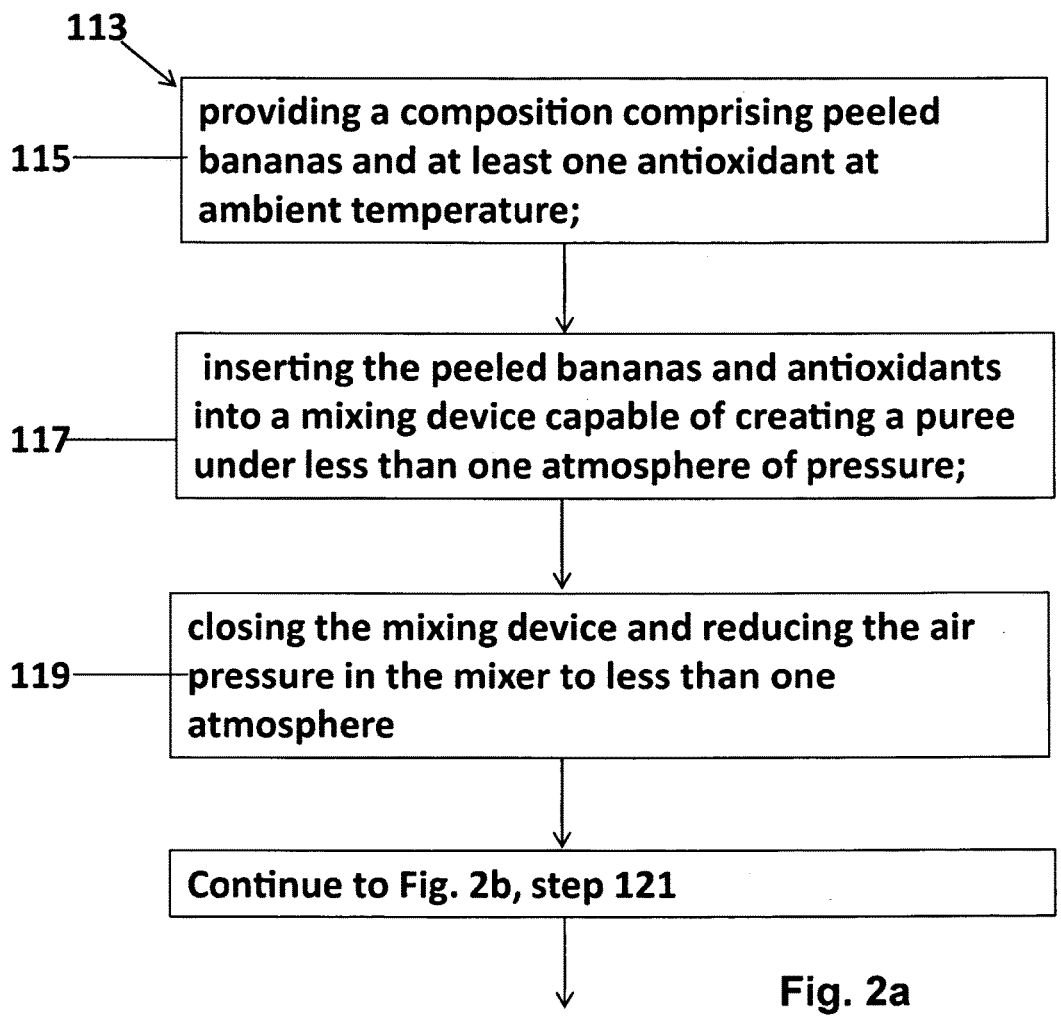
FIGS. 2a-2d depict a flow chart illustrating a method for making frozen food products, in accordance with embodiments of the present invention.
Figure 2B:
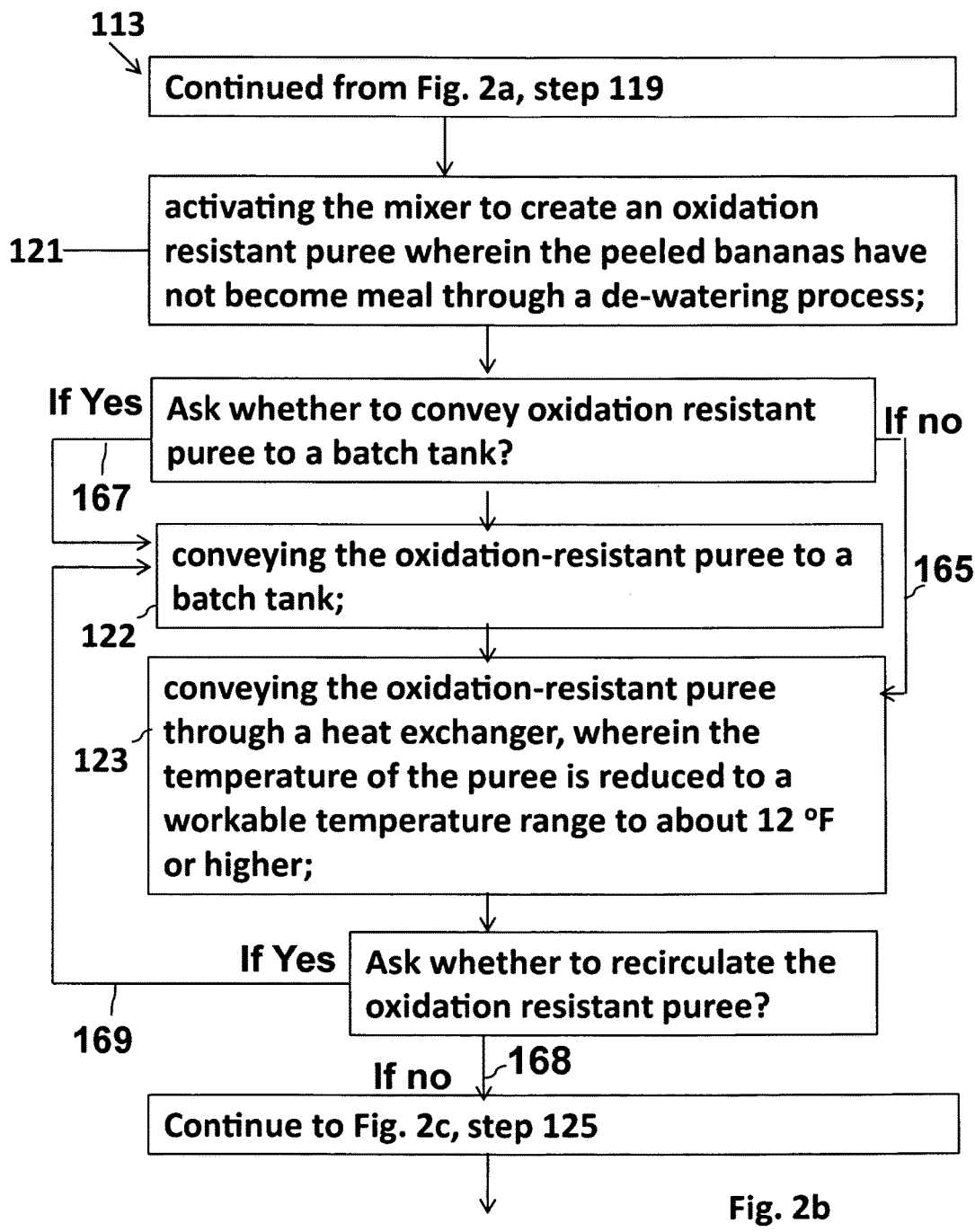
Figure 2C:
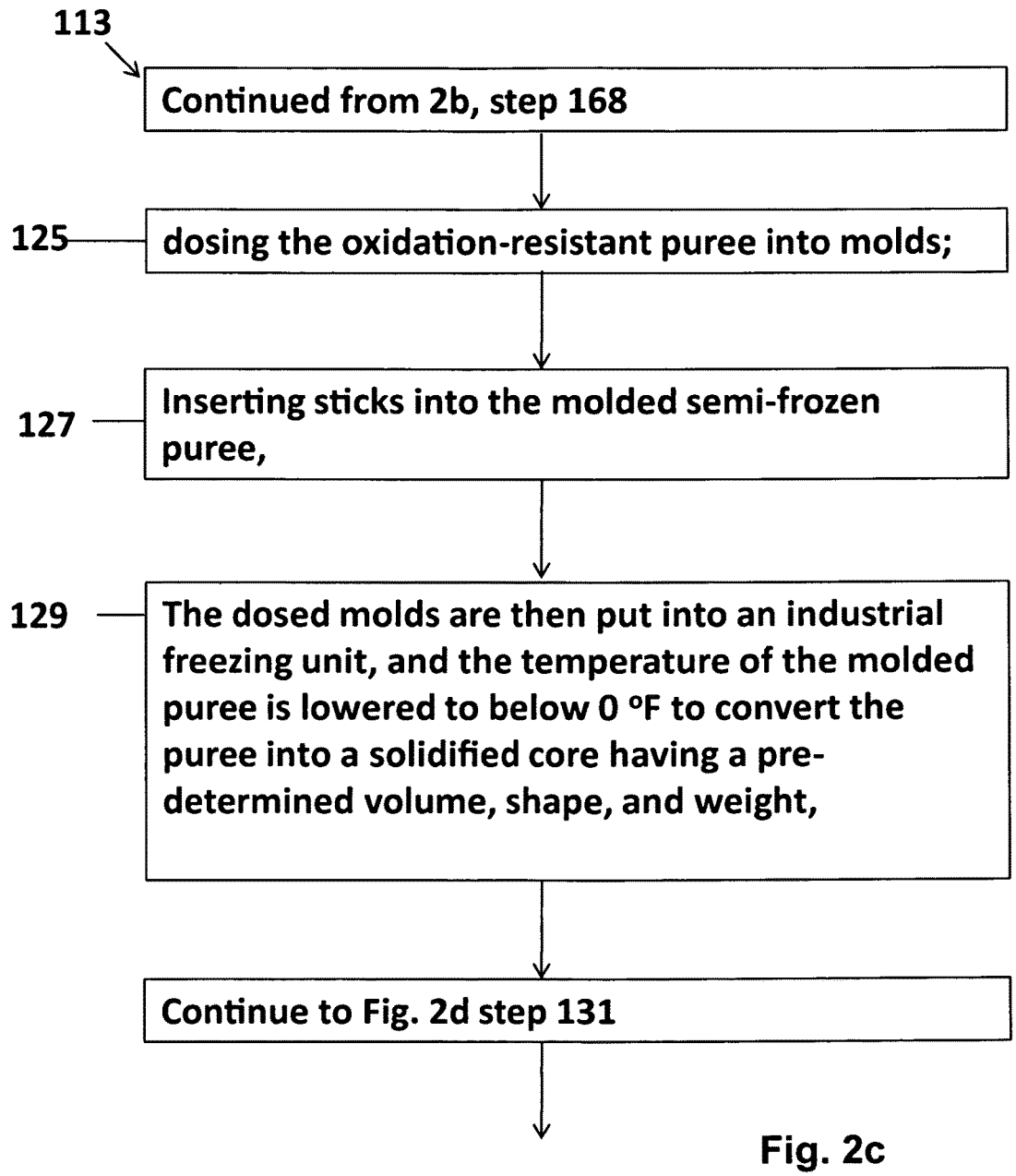
Figure 2D:
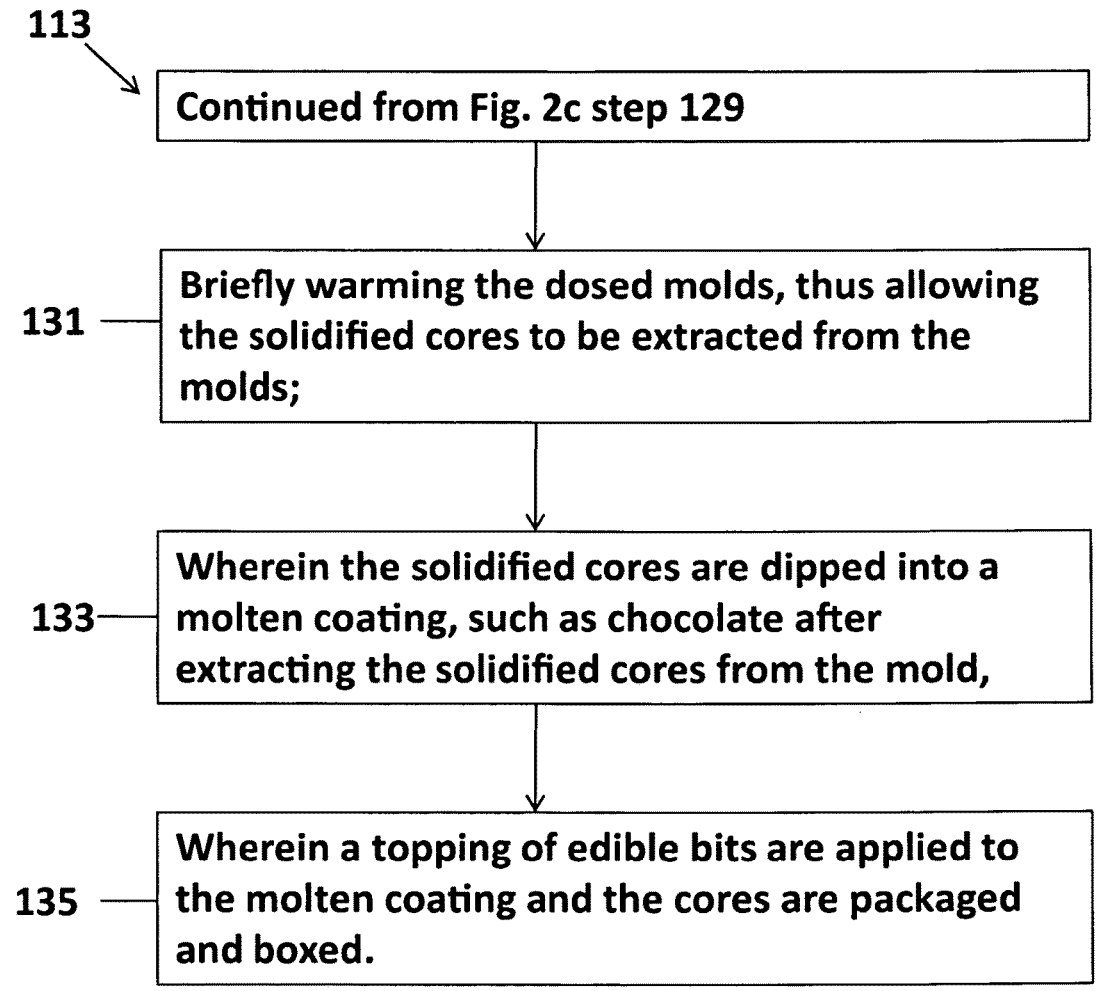

As used herein, the term "stick" includes wooden sticks, paper sticks, or any plastic or other form of member capable of supporting a frozen novelty product. In some forms the term stick may include an edible composition. Sticks may be of various shapes and sizes.

As used herein, unless defined otherwise, the term "chocolate" includes chocolate in its common usage or as used in Arbuckle. In addition it includes any other composition which at a higher temperature as a liquid can form a coating on a substrate and thereafter, on reduction of temperature, set. Typical examples of such other materials include fat and sugar based compositions of that kind. "Chocolate" therefore may or may not include cocoa or any other chocolate flavoring.

As used herein, the term "dip", unless defined otherwise, means insertion of the material to be coated into a bath (stationery or moving) of the liquid composition to form the coating. In other forms however where the context so allows the term "dip" may include any alternative procedures such as spraying.

As used herein, the term "fruit meat", unless defined otherwise, means the edible portion of a fruit, e.g. a peeled banana.

As used herein, the term "puree", unless defined otherwise, means flowable banana meat or a flowable blend of fruit meat and other edible ingredients.

As used herein, unless defined otherwise, the term "flowable", when referring to puree, refers to being able to achieve a satisfactory production rate using the puree.

As used herein, the term "semi-freeze" or "semi-frozen" unless defined otherwise, means reducing the temperature of material to less than or equal to 32° F., so that at least a portion of its liquid content, but not necessarily all, has been converted to a solid state.

As used herein, the term "freeze" or "frozen" means reducing the temperature of material to less than or equal to 32° F., so that it has been converted from a liquid or semi-frozen state to a solid state.

As used herein, the term "solidified state", "solidified", "solid", or "hardened", unless defined otherwise, means that a material has been rendered non-flowable through conversion of a sufficient amount of it liquid content to a crystallized state.

As used herein, unless defined otherwise, the term "frozen banana stick novelty" means a fruit meat core on a stick, frozen, dipped in a coating such as chocolate, and perhaps an edible topping consisting of a wide variety of bit-like materials such as rainbow sprinkles, granulated peanuts, coconut, crushed candy or cookies.

As used herein, the term "palatability" or "palatable", unless defined otherwise, means acceptable to the taste or sufficiently agreeable in flavor to be eaten.

As used herein, the term "dynamic freezing" is a non-equilibrium, non-steady state freezing process under which a rate of freezing is not equal to a rate of melting of a material, such as water forming ice crystals, by which the ice crystals have a smaller diameter than they would if formed under equilibrium freezing conditions.

As used herein, a "batch tank", unless otherwise defined, may be a vessel for temporarily holding or storing puree after it has been formed in processes for making the frozen food products of the present invention, e.g., prior to transferring the puree to a food processing device such as a scraped surface heat exchanger. A batch tank may support either batch or continuous modes of food processing operations. A batch tank may provide a refrigeration function.

As used herein, a "workable temperature range for molding the puree", includes a temperature range from about 12° F. to about 22° F. However, a workable temperature range for a molding a puree depends upon its flowability vs. temperature properties because the puree must be able to flow into the mold. Therefore, a workable temperature range for molding the puree depends up factors including the size and shape of the mold, the composition of the puree, and the type and quantity of stabilizer used, if any. If the temperature of the puree drops below the workable temperature range for molding the puree, molded cores become prone to undesirable air pockets. If the temperature of the puree exceeds the workable temperature range for molding the puree, then the mouth feel of the molded core will be characterized by an icy texture because an unnecessarily large portion of water will be frozen in a non-dynamic manner.

As used herein, the "workable temperature range for extrusion", includes a temperature range from about 0° F. to about 12° F. However, a workable temperature range for a extruding a puree depends upon its flowability vs. temperature properties because the puree must be able to flow through the extruder head. Therefore, a workable temperature range for extruding the puree depends up factors including the size and shape of the extruder head, the composition of the puree, and the type and quantity of stabilizer used, if any. If the temperature of the puree drops below the workable temperature range for extruding the puree, the extruded shape become prone to undesirable air pockets, and folds. If the temperature of the puree exceeds the workable temperature range for extruding the puree, then the extruded shape will not be able to hold its shape and the mouth feel of the extruded core will be characterized by an icy texture because an unnecessarily large portion of water will be frozen in a non-dynamic manner.

Technical Problem to Be Solved

There is increasing demand for healthy frozen novelty products. Novelties comprising frozen banana are an ideal alternative to ice cream novelties. Prior to the present invention, however, a means did not exist to mass product such products. When making a frozen fruit puree following the method taught by Feldspauch, one of the challenges is to reduce frozen fruit into a flowable state. This requires high-power machinery and offers minimal control over the temperature of the resulting semi-frozen puree. Further, individual portions of fruit meat are typically frozen via a convection process, which can be time-consuming and expensive. To greatly improve manufacturing efficiency, it is desirable to convert fruit meat to a puree at ambient temperature and then reduce the temperature of the puree via a conduction process to a semi-frozen but flowable state. However, products made from a puree formed at ambient temperature tend to present an icy texture instead of a smooth, creamy mouth-feel, and are brownish in appearance and offer an unappealing taste. Therefore, one aspect of the present invention is to provide a method for mass production of frozen food products from a puree formed at ambient temperature that offer a creamy mouth-feel and a fresh fruity flavor and visual appeal.

The present method provides an apparatus and methods to retard the oxidation of a puree including banana meat that has been formed at ambient temperature.

Oxidation resistance alone, however, has proven to be insufficient to ensure an appealing product. This is because bananas contain water, carbohydrates, protein, and fat. The water in unprocessed banana meat is bound by a membrane within each cell of the meat. Each cell is typically under 60 microns in diameter. Thus, the ice crystals that are formed when banana meat is frozen via a convection process, as is the case with prior methods, are micro crystals. The current method, however, requires the banana composition to be reduced to a puree at room temperature and then reduced in temperature. This process, though requiring less energy, breaks down the cell walls so the water is no longer contained within a cell having a diameter approximately 60 microns. The resulting puree contains free water, which when reduced in temperature is free to form large ice crystals. In theory, a creamy texture and appealing mouth-feel will still result if ice crystal formation can be reduced in size to roughly the diameter of an intact banana cell.

Fruit meat converted at ambient temperature to a puree is susceptible to discoloration, or browning. Browning results when an enzyme present within fruit meat, polyphenol oxidase, is exposed to oxygen in the air. This enzyme is normally encapsulated within the cell structure of the banana meat. Thus, peeled banana meat with cell walls that are intact can remain exposed to air for hours with only negligible browning. Conversion of banana meat to a puree at ambient temperature, however, breaks down the cell walls that serve to shield the enzyme from oxygen in the surrounding air. Banana puree will become noticeably brown and oxidized in taste in minutes rather than hours at ambient temperature.

Commercial viability of this new method, then, requires a means to promote small ice crystal formation and a means to prevent the enzymatic reaction that results in oxidation of banana puree.

The rate of oxidation of a puree including banana meat may be retarded by including antioxidants in the composition. Commercially available antioxidants are not typically cold-soluble. For this reason, they are not compatible with prior methods. This new method, however, is compatible with the use of antioxidants because the composition containing banana meat is reduced to a puree at ambient temperature. This provides sufficient water of hydration to allow for absorption of antioxidants.

Experimentation has shown that ice crystal formation in a semi-frozen fruit puree can be held to an acceptable size through a combination of dynamic freezing such as occurs in a scraped surface heat exchanger and the use of a chemical stabilizer. The workable temperature range for extrusion that allows for dynamic freezing is from about 0° F. and 12° F. The workable temperature range for molding that allows for dynamic freezing is from about 12° F. and 22° F. The primary purposes of using stabilizers and the effect of dashers of scrapable heat exchangers are to produce smoothness, body and texture, to retard ice crystal growth during storage, and to provide uniformity of products and resistance to melting. Stabilizers function through their ability either to form gel structures in water or to combine with water as water of hydration.

The stabilizer/s may be chosen from the group consisting of gelatin, egg white, guar gum, locust bean gum, tara gum, xanthan gum, sodium alginate, propylene glycol alginate (PGA), carrageenan, CMC, and microcrystalline cellulose (MCC).

The inventor of the present application has further found that formation of the puree under a partial vacuum when combined with antioxidants added to the composition successfully halts the enzymatic reaction and provides the product with a fresh appearance and taste.

Beyond a huge increase in manufacturing efficiency, there are numerous other benefits of the present invention. Inclusion of stabilizer/s into the puree, which prevents the formation of large ice crystals during product manufacture, also serves to prevent the growth of ice crystals resulting from the inevitable freeze-thaw cycles that products are exposed to during storage and transportation. Water in the puree contains dissolved solids, which prevent it from freezing completely. When exposed to increased temperature during storage or transportation, some of the ice crystals melt. Conversely more water is refrozen into ice crystals when the temperature is lowered. This fluctuation in temperature and slow freezing can result in large ice crystal formation and, therefore, texture changes. Stabilizers absorb or hold some of the water freed by melting, thereby preventing the formation of large ice crystals, if re-freezing occurs. This improves product shelf-life and reduces temperature-sensitivity during shipping. Decreased temperature sensitivity allows for less expensive options for shipment of product. Likewise, the use of antioxidants becomes possible when a puree is formed at ambient temperature, as is the case in this new method. Antioxidants help products to resist oxidation during manufacture but also help them to resist oxidation that might occur during long-term storage, transportation, and even during consumption. Further, because the puree is formed at room temperature, this new method allows for the use of emulsifiers. These additives further increase the creaminess of the product. As an added benefit, an oxidation-resistant puree can be stored at ambient temperature for extended periods of time. This is beneficial because bananas are a commodity and it is common for pricing and supply to go up and down based upon factors such as fuel cost and weather. The ability to purchase bananas at the best pricing, convert the bananas to a puree and store puree at ambient temperature for later use allows manufacturers to reduce product cost.

A second large advantage of the new method is the ability to purchase banana puree rather than bananas. This eliminates the need to form a puree at the point of manufacture. This results in cost savings, as puree costs less than raw bananas and is available year-round. Barrels of puree require less storage space than bananas, and are easily shipped. Thus, a manufacturer can set up manufacturing facilities within highly populated areas. This reduces the reliance upon a single manufacturing site and costly shipping of frozen product from that site to populated areas around the country, and beyond.

A third significant advantage of the new method is the creamy texture and mouth-feel that results from the fine particle size in the composition when reduced to puree at ambient temperature and the micro ice crystal size which results from inclusion of a stabilizer in the composition and from the rapid cooling of the composition in a scrapped surface heat exchanger, or the like.

A fourth significant advantage of the new method is the adaptability of its process steps toward product innovation in the form of novel shapes, flavorings, colorings, and edible inclusions.

Further, when a puree is cooled via a scraped surface heat exchanger, it may be continuously circulated to maintain a desired temperature until molded or extruded. This allows the manufacturing process to pause/resume as needed to accommodate breaks, maintenance, and other needed halts in production. Because scraped surfaced heat exchangers are more efficient than some other methods of freezing, such as blast freezers, less electricity is needed and production rates may be increased. The improved temperature control allowed by scraped surface heat exchangers facilitate mold filling and extrusion. Dashers in the scraped surface heat exchanger also aid in blending of product. Reduction of fruit meat to a puree at ambient temperature requires less sheer than the prior method. Reduced sheer results in reduced power requirement and improved sweetness.

One objective of the present invention is to provide a means to produce frozen banana novelty products that is both economical and highly-scalable.

A second objective of the present invention is to provide a means to produce frozen banana novelty products that are oxidation-resistant during the process steps of manufacture and during long-term storage and transportation.

A third objective of the present invention is to provide a means to produce frozen banana novelty products that retards the formation of large ice crystals during the process steps of manufacture and during long-term storage and transportation.

A fourth objective of the present invention is to provide a manufacturing method that allows for future innovation.

FIG. 1 depicts a flow diagram listing steps 105-111 of a method 100 for making frozen food products. In a step 105 of this method 100, a puree formed under less than one atmosphere of pressure may be provided. The puree includes banana meat and at least one antioxidant, but has not become meal through a de-watering process. In a step 111, the puree may then be passed through a scraped surface heat exchanger 34, depicted in FIG. 8. The heat exchanger 34 may be adapted to cool the puree so the puree may be cooled to a workable temperature range for making frozen food products having a pre-determined volume, shape, and weight. The workable temperature range for molding the puree may be from about 12° F. to about 22° F., and the workable temperature range for extruding the puree may be from about 0° F. to about 12° F.

In an embodiment of the method 100, the puree includes a stabilizer.

In an embodiment of the method 100, the antioxidant may be an organic acid. Some of the organic acids which can be used are citric acid, ascorbic acid, lemon juice, and lime juice.

In an embodiment of the method 100, the puree may be introduced to the scraped surface heat exchanger 34 by way of a batch tank 7.

In an embodiment of the method 100, the puree has been pasteurized to retard the rate of oxidation.

In an embodiment of the method 100, there may be an extruder 10 after the scraped surface heat exchanger 34, where the temperature of the puree at the exit end of the heat exchanger may be reduced to between about 0° F. and about 5° F.

In an embodiment of the method 100, the banana meat in the puree may be greater than or equal to 50 percent by weight of the puree. In another embodiment the puree may include any weight percent of banana meat between about 0 weight percent and about 100 weight percent.

In an embodiment of the method 100, the puree made by this method may be substantially homogeneous.

In an embodiment of the method 100, the puree made by this method may be substantially smooth.

In an embodiment of the method 100, the puree made by this method may be substantially free from unintended fibrous strings.

In an embodiment of the method 100, air may or may not have been intentionally whipped into the puree.

In an embodiment of the method 100, the puree made by this method has not been oxidized.

FIGS. 2a-2d depict a flow diagram listing steps 115-135 and 165-169 of a method 113 for making frozen food products. In a step 115 of this method 113 a composition at ambient temperature made of peeled bananas and at least one antioxidant may be provided. In a step 117, the composition may be inserted into a mixing device 12 capable of making a puree under less than one atmosphere of pressure, depicted in FIG. 6. In a step 119, the mixing device 12 may be closed, and the air pressure in the mixing device 12 may be reduced to less than one atmosphere, depicted in FIG. 7. In a step 121, the mixing device 12 may be activated to form an oxidation-resistant puree, where the puree has not become meal through a dewatering process. In a step 122, the puree may be introduced to the heat exchanger 8 by means of a batch tank 7, which would be operably coupled to the heat exchanger 8. The puree may be conveyed to a batch tank in a step 167, or may be directly conveyed to a heat exchanger in a step 165. In a step 123 the oxidation-resistant puree may be conveyed through a heat exchanger 8, depicted in FIG. 8. The puree may then be passed through the heat exchanger 8, reducing the temperature of the puree to between about 12° F. and 22° F. The option may then be chosen to recirculate the oxidation-resistant puree in a step 169, which would then take it back to the batch tank. If the option to recirculate the puree is not chosen, in a step 125, the puree may be conveyed to a doser 14, which may dose the oxidation-resistant puree into molds 13, depicted in FIGS. 4 and 9.

Figure 9:
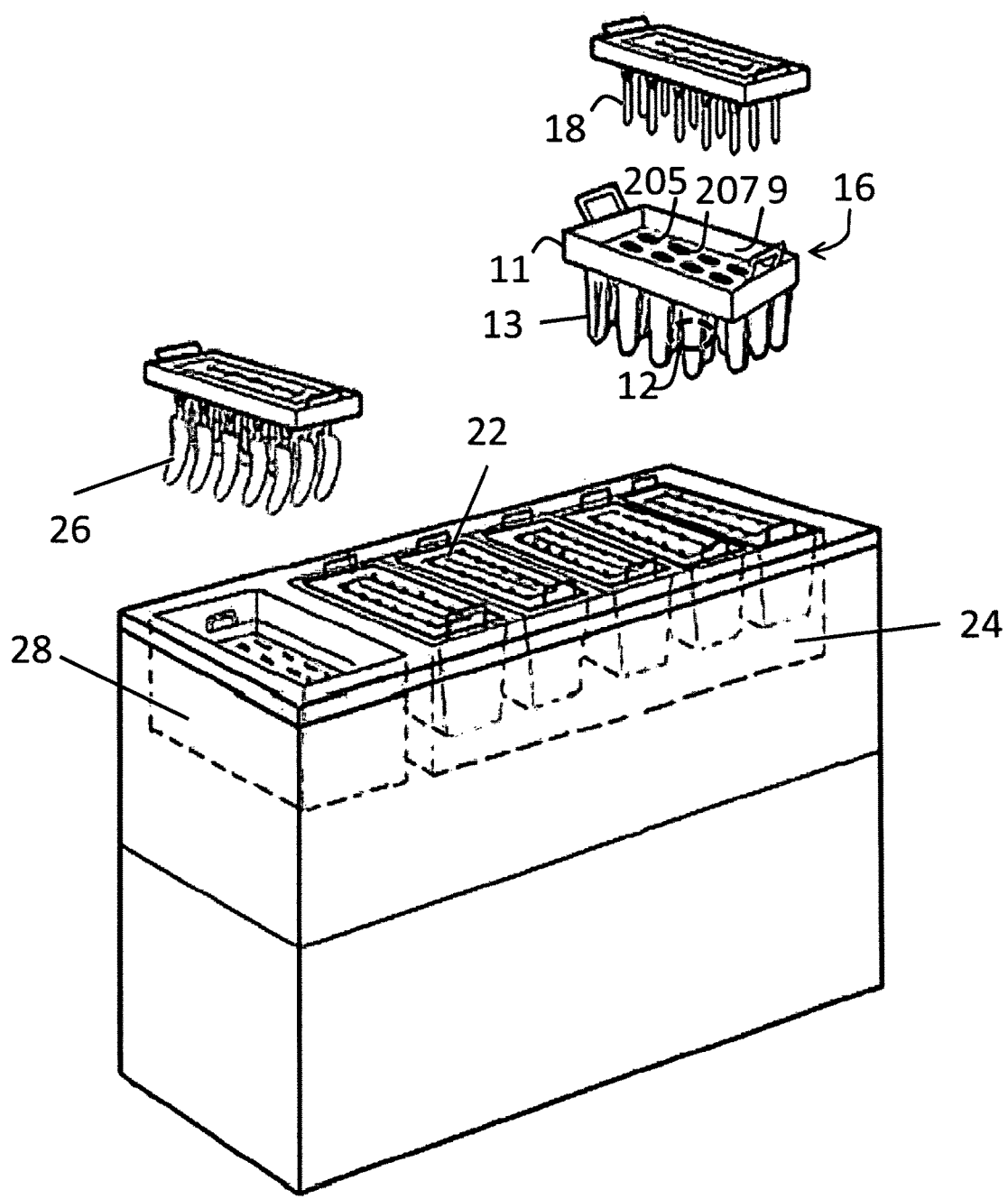
FIG. 9 depicts a basket mold, sticks, a stick holder, a freezing unit, a warming unit, and solidified cores, in accordance with embodiments of the present invention.

In an embodiment of the method 113, a step 127 has sticks 18 inserted into the basket molds 16 dosed with semi-frozen puree, depicted in FIG. 9.

In an embodiment of the method 113, a step 129 has the stick-inserted and dosed molds 22 put into an industrial freezing unit 24, depicted in FIG. 9. The temperature of the dosed molds 22 may be then lowered to below 0° F. within the freezing unit 24 in order to convert the puree into a solidified core 26 with a pre-determined volume, shape, and weight.

In an embodiment of the method 113, a step 131 has the dosed molds 22 briefly warmed, such as being placed into a warm bath 28, depicted in FIG. 9. This allows the solidified cores 26 to be extracted from the individual molds 13.

In an embodiment of the method 113, a step 133 has the solidified cores 26 dipped into a molten coating 30 (such chocolate) after extracting the solidified cores 26 from the individual molds 13, depicted in FIG. 10.

In an embodiment of the method 113, a step 135 has a topping of edible bits 32 applied to the molten coating 30 depicted in FIG. 10, and, once hardened, the coated and topped solidified cores are packaged and boxed.

Figure 8:
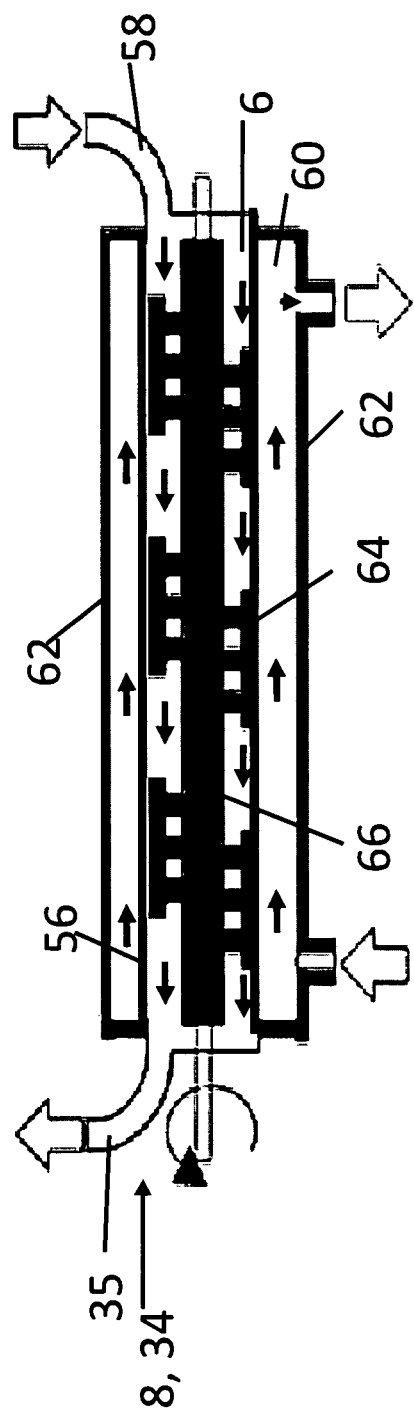
FIG. 8 depicts a scraped surface heat exchanger, in accordance with embodiments of the present invention.

In an embodiment of the method 113, the heat exchanger 8 may be a scraped surface heat exchanger 34, depicted in FIG. 8.

In an embodiment of the method 113, the composition includes at least one stabilizer. The stabilizer/s may be chosen from the group consisting of gelatin, egg white, guar gum, locust bean gum, tara gum, xanthan gum, sodium alginate, propylene glycol alginate (PGA), carrageenan, CMC, and microcrystalline cellulose (MCC).

In an embodiment of the method 113, the puree made by this method can be substantially homogeneous.

In an embodiment of the method 113, the puree made by this method can be substantially smooth.

In an embodiment of the method 113, the puree made by this method can be substantially free from unintended fibrous strings.

In an embodiment of the method 113, air has not been intentionally whipped into the puree.

In an embodiment of the method 113, the puree has not been oxidized.

Figure 3A:
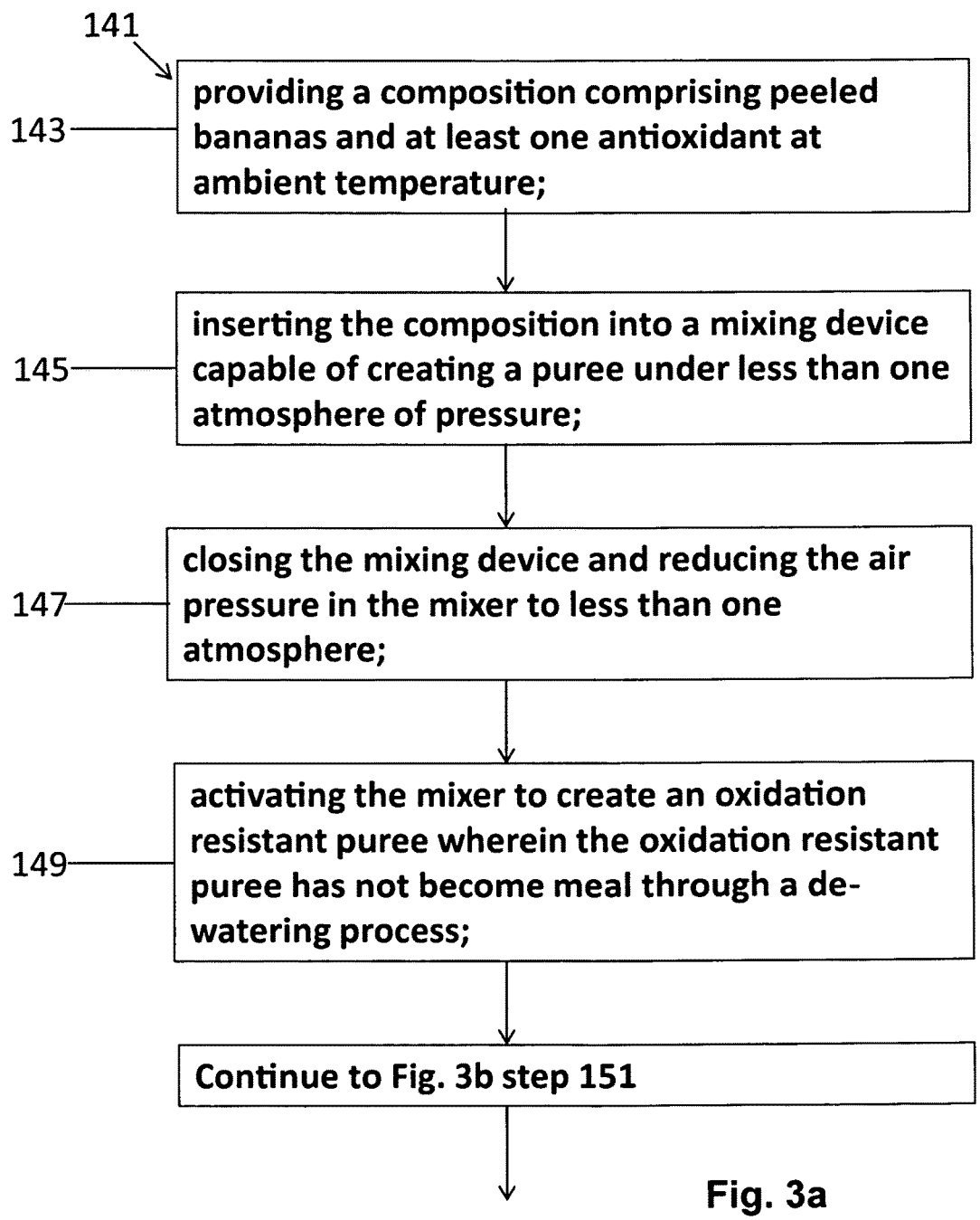
FIGS. 3a-3b depict a flow chart illustrating a method for making frozen food products, in accordance with embodiments of the present invention.
Figure 3B:
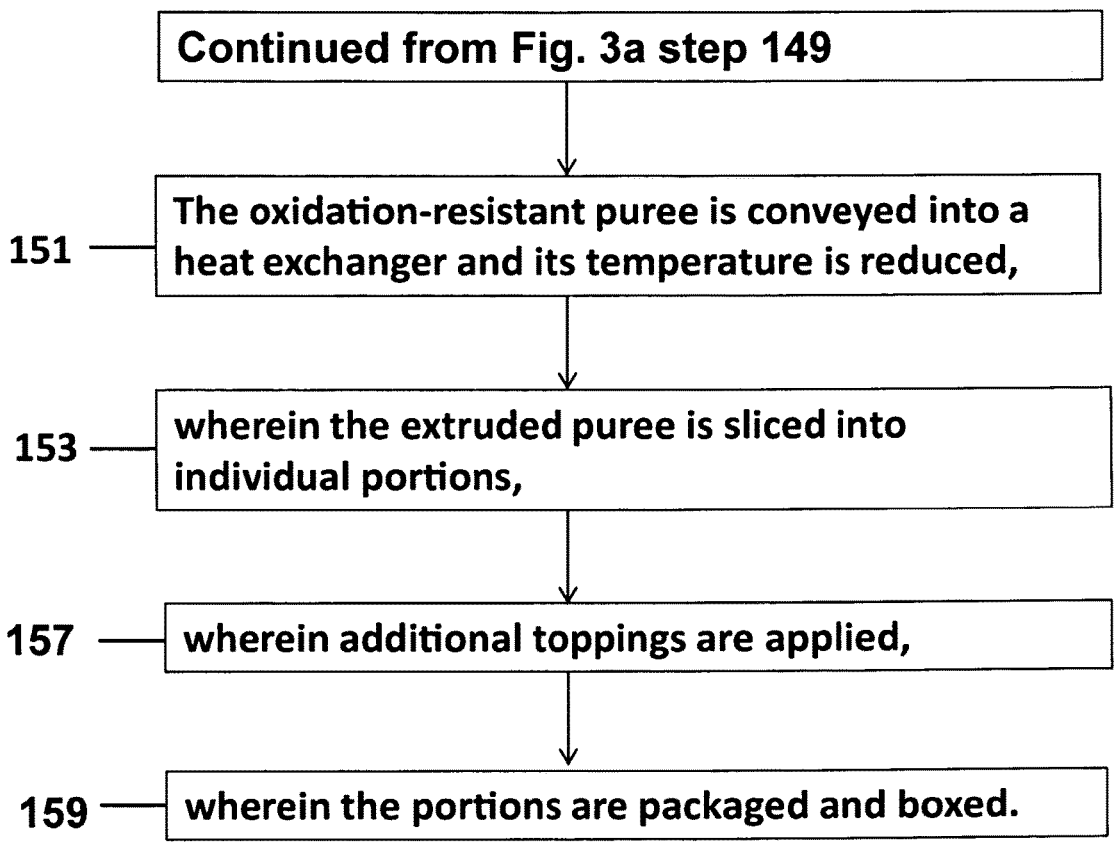
Figure 11:
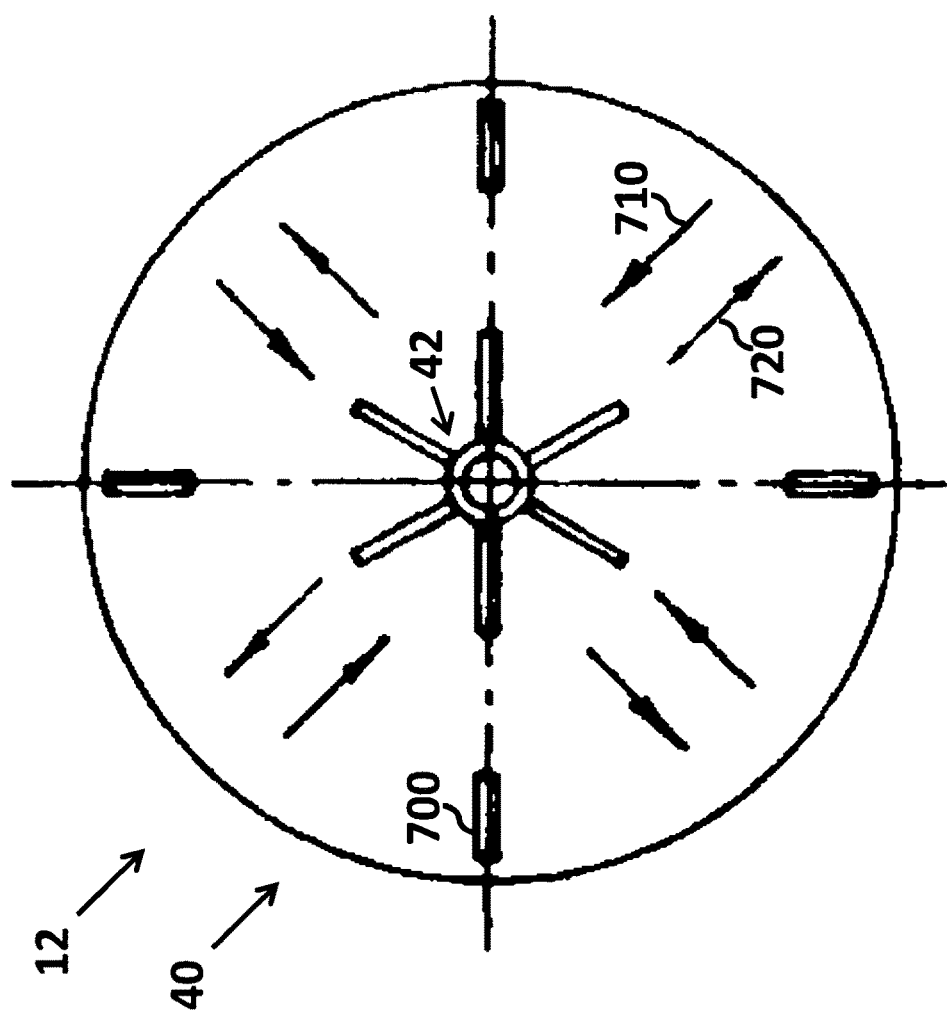
FIG. 11 depicts an axial cross sectional view of the mixing bowl of a mixing device, in accordance with embodiments of the present invention.

FIGS. 3a-3b depict a flow diagram listing steps 143-163 of a method 141 for making frozen food products. In a step 143 of this method 141, a composition which includes peeled bananas and at least one antioxidant may be provided at ambient temperature. In a step 145, the composition may be inserted into a mixing bowl 40 of a mixing device 12 via hopper 6, depicted in FIG. 6 and described in associated text, herein. In a step 147, the mixing device 12 may be closed and the air pressure in the mixing device 12 may be reduced to less than one atmosphere of pressure, depicted in FIG. 7. In a step 149, the motor 44 of the mixing device 12 may be activated, rotating the impeller 42, eg. a mixing blades, moves the composition radially and mixing baffles 700, depicted in FIG. 11 provide an axial vector of the radial movement of the composition toward walls of the mixing bowl 40 in the direction of arrows 710, 720 of mixing device 12, enabling forming an oxidation resistant puree under less than one atmosphere of pressure, depicted in FIG. 6. During this process, the oxidation resistant puree has not become meal through a de-watering process. In a step 151, the oxidation-resistant puree may be conveyed into a heat exchanger 8, depicted in FIG. 8, where the temperature of the puree at the exit end of the heat exchanger 8 may be reduced from ambient temperature to 12° F. or lower, and then through an extruder 10, depicted in FIG. 5.

Figure 5:
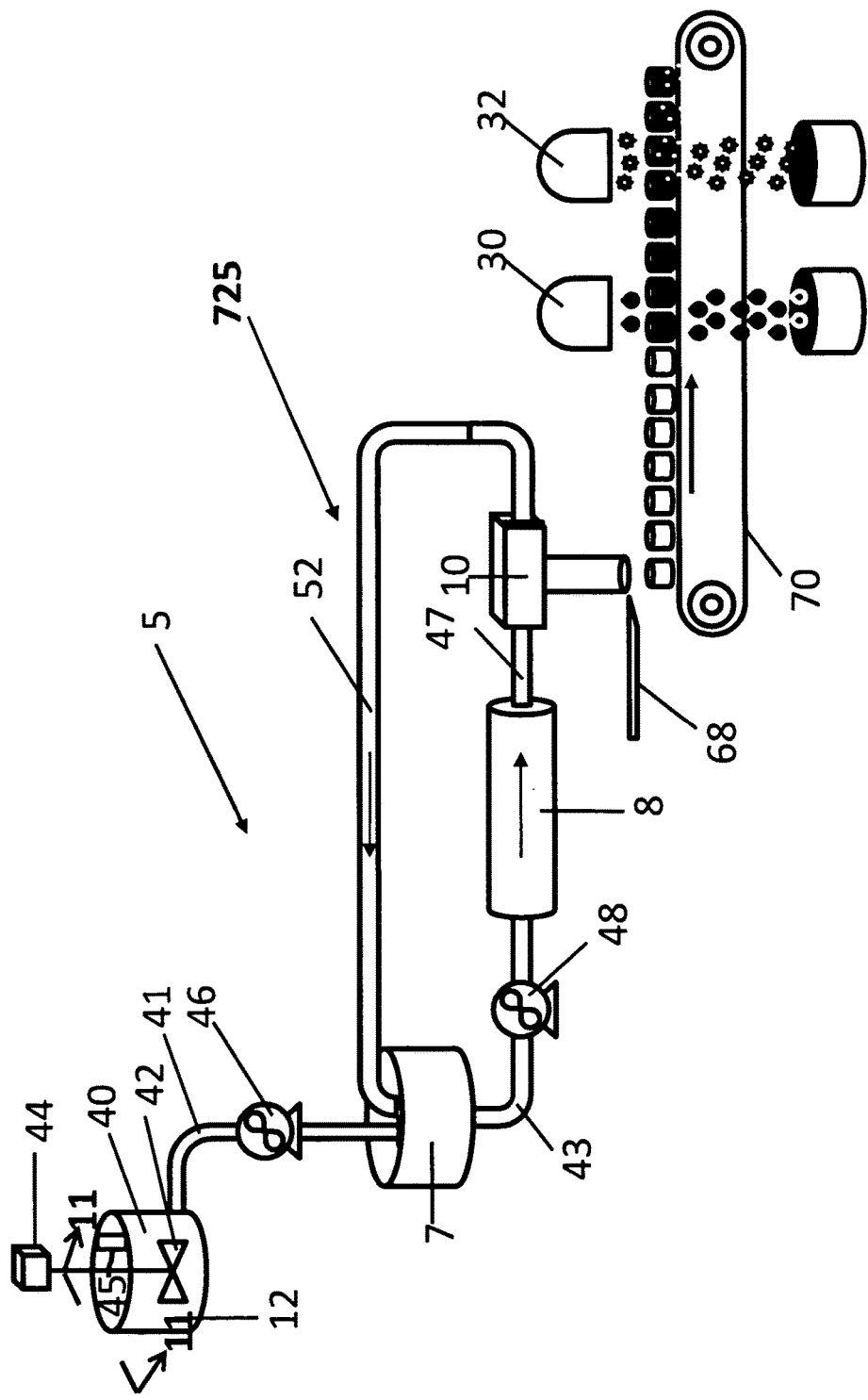
FIG. 5 depicts a schematic flow diagram for making frozen food products, including an extruder, in accordance with embodiments of the present invention.

In an embodiment of the method 141, step 153 has the extruded puree shaped into individual portions resembling bonbons or banana slices, depicted in FIG. 5.

In an embodiment of the method 141, step 155 has the individual portions of extruded puree enrobed in a molten coating 30 such as chocolate, depicted in FIG. 5.

In an embodiment of the method 141, a step 157 allows additional toppings to be applied to the molten coating 30 of the individual portions of extruded and enrobed puree, depicted in FIG. 5.

In an embodiment of the method 141, step 159 has the portions are packaged and boxed after all modifications to solidified cores 26 have been completed.

In an embodiment of the method, the heat exchanger 8 may be a scraped surface heat exchanger 34, depicted in FIG. 8.

In an embodiment of the method 141, the puree may be introduced into the scraped surface heat exchanger 8 by way of a batch tank 7.

In an embodiment of the method 141, the oxidation-resistant puree may be looped back to the input of the heat exchanger 8, depicted in FIG. 5. This maintains the oxidation-resistant puree at a desired temperature until it may be extruded by the extruder 10.

In an embodiment of the method 141, the banana meat in the puree may be greater than or equal to 50 percent by weight of the puree.

In an embodiment of the method 141, the puree made by this method can be substantially homogeneous.

In an embodiment of the method 141, the puree made by this method can be substantially smooth.

In an embodiment of the method 141, the puree made by this method can be substantially free from unintended fibrous strings.

In an embodiment of the method 141, air has not been intentionally whipped into the puree.

Figure 4:
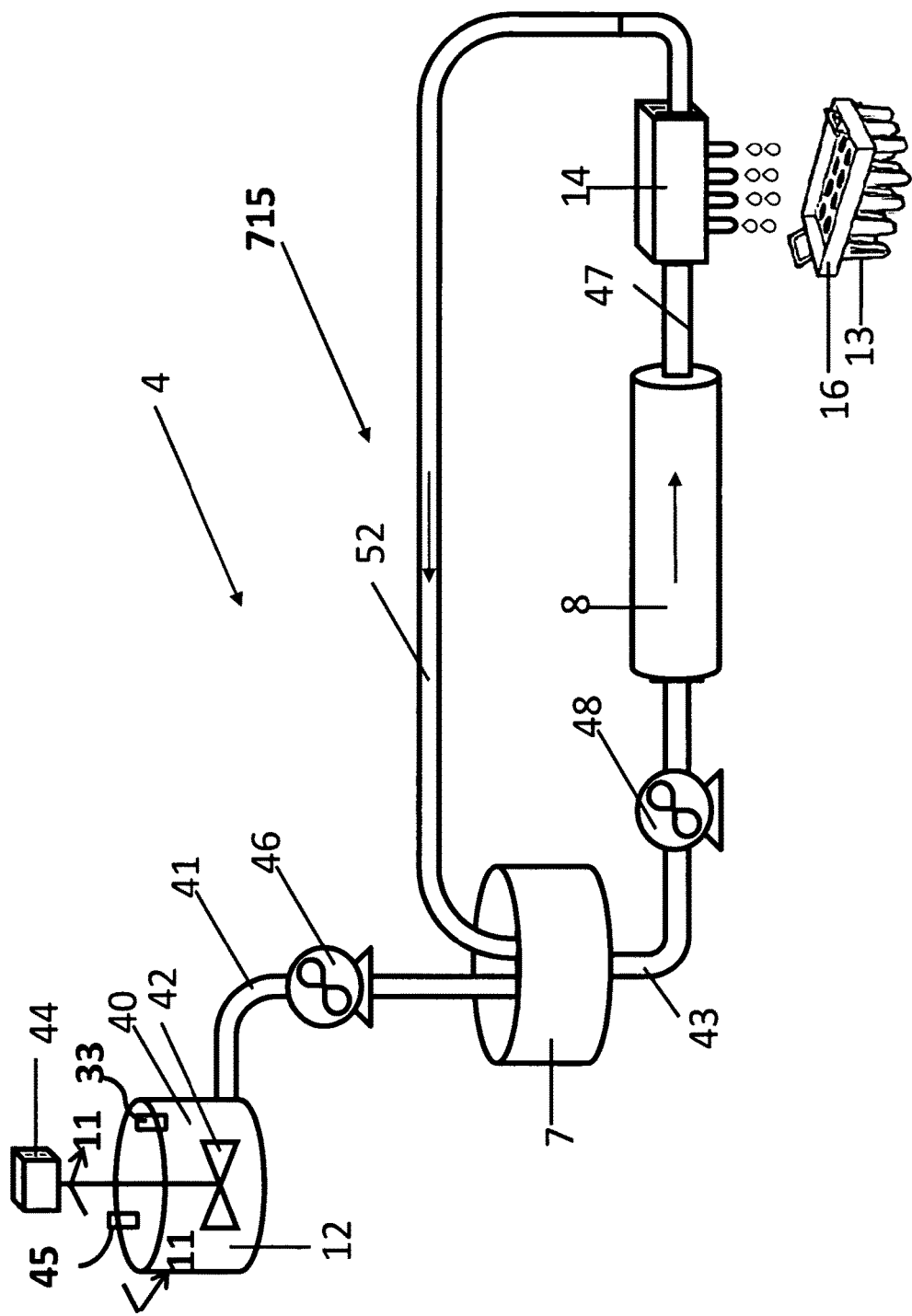
FIG. 4 depicts a schematic flow diagram for making frozen food products, including a doser, in accordance with embodiments of the present invention.

FIG. 4 depicts a schematic diagram of apparatus 4 for making molded frozen food products. The apparatus 4 comprises a mixing device 12, a batch tank 7 operably coupled to the mixing bowl 40 via exit line 41, a scraped surface heat exchanger 8, and a doser 14. The mixing device includes an impeller 42, e.g., a mixing blade, a mixing bowl 40, and a mixing motor 44. The mixing device 12 may also be equipped with mixing baffles 700, depicted in FIG. 11, and described in associated text, herein. The mixing device 12 may also be equipped with a vacuum source, which may be able to reduce the inside pressure below one atmosphere. Further, the mixing device 12 may optionally be equipped with an inert gas source 33, such as nitrogen, to provide a blanket of inert gas over the composition, including banana meat or the puree, there from. The inert gas may also raise the pressure in the mixing device when its lid may be closed to discharge the puree out of the mixing bowl 40 into an exit line 41 of the mixing device 12.

Alternatively pump 46 may advantageously be used to discharge the puree from the mixing bowl 40. Feed line 43 conveys puree from the batch tank 7 to the entrance end of the scrapped surface heat exchanger 8. The scrapped surface heat exchanger cools the puree, and is depicted in more detail in FIG. 8, and described in associated text, herein. A feed line 47 conveys the cooled puree to a doser for filling the individual molds 13.

In an embodiment, a pipe 52 of a recirculation loop 715 may transport the cooled puree from the doser 14 back to the batch tank 7, so that the oxidation-resistant puree may be recirculated through the heat exchanger 8, maintaining the desired temperature until dosing the oxidation-resistant puree.

In an embodiment, the apparatus 4 has a means of controlling the temperature of the puree to within an ideal temperature range for forming a frozen food product having a predetermined shape. The workable range may be between 12° F., and 22° F., when dosing a mold.

In an embodiment, the banana meat in the puree may be greater than or equal to 50 percent by weight of the puree. In another embodiment the puree may include any weight percent of banana meat between about 0 weight percent and about 100 weight percent.

FIG. 5 depicts a schematic diagram of apparatus 5 for making extruded frozen food products, made out of a series of parts. The apparatus 5 comprises a mixing device 12, a batch tank 7 operably coupled to the mixing bowl 40 via exit line 41, a scraped surface heat exchanger 8, and a doser 14.

The mixing device includes an impeller 42, e.g., a mixing blade, a mixing bowl 40, a mixing motor 44, and mixing baffles 700, depicted in FIG. 11 and described in associated text, herein. The mixing device 12 may also be equipped with a vacuum source 45, which may be able to reduce the inside pressure below one atmosphere. Further, the mixing device may optionally be equipped with an inert gas source 33, depicted in FIGS. 4 and 6, and described in associated text, herein, to provide nitrogen or other appropriate inert gas for blanketing the composition, including banana meat or the puree, there from. The inert gas may also raise the pressure in the mixing device when its lid 30, also depicted in FIG. 6, and described in associated text, herein, may be closed to discharge the puree out of the mixing bowl 40 into an exit line 41 of the mixing device 12. Alternatively pump 46 may advantageously be used to discharge the puree from the mixing bowl 40. Feed line 43 conveys puree from the batch tank 7 to the entrance end of the scrapped surface heat exchanger 8. The scrapped surface heat exchanger cools the puree, and is depicted in more detail in FIG. 8, and described in associated text, herein. A feed line 47 conveys the cooled puree to an extruder 10 for shaping of the semi-frozen puree. The extruded puree may then be cut into individual portions by a cutting blade 68, and moved on a conveyer belt 70. The individual portions are enrobed in a molten coating 30 such as chocolate and additional toppings are applied.

In an embodiment, the apparatus 5 has a means of controlling the temperature of the puree to within an ideal temperature range for extruded puree. The workable range may be between 12° F., and 0° F.

In an embodiment, a pipe 52 of a recirculation loop 725 may transport the cooled puree from the extruder 10 back to the batch tank 7, so that the oxidation-resistant puree may be recirculated through the heat exchanger 8, maintaining the desired temperature until extruding the oxidation-resistant puree.

In an embodiment, the banana meat in the puree may be greater than or equal to 50 percent by weight of the puree. In another embodiment the puree may include any weight percent of banana meat between about 0 weight percent and about 100 weight percent.

Figure 6:
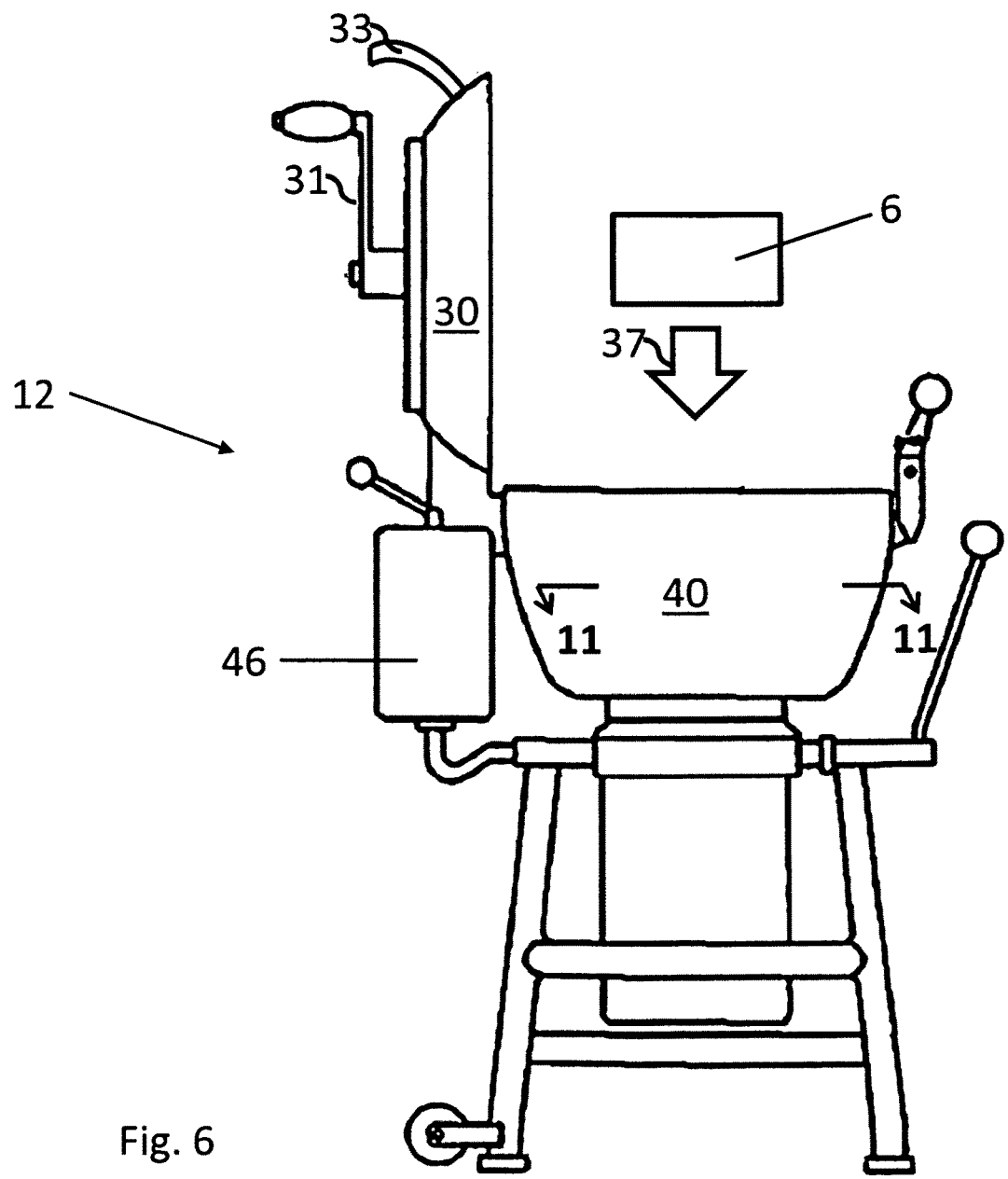
FIG. 6 depicts banana meat and antioxidants being loaded into a mixing device, in accordance with embodiments of the present invention.

FIG. 6 depicts an elevation view of the mixing device 12 of the apparatus 4, shown in FIGS. 4-5. A composition, including peeled banana and at least one antioxidant may be inserted into a mixing bowl 40 of a mixing device 12 via hopper 6. In this embodiment, the lid 30 of the mixer may be open for charging the composition. Mixing baffles 700, as depicted in FIG. 11, and described in associated text, herein, may be stationary or rotatable using handle 31, or a motor. The mixing baffles 700 fold the puree in a rolling motion back onto the impeller 42, e.g., cutting blades of a vertical cutter mixer, to ensure an even consistency of the puree. The main motor 44 supplies power directly to the scimitar knives at the bottom of the bowl 40. When the motor 44 may be set to high speed, the knives may be driven at 3500 RPM. The knives are fixed at an angle on a rotating shaft so they pull the product down through the central portion of the bowl 40, slicing it in the process. The puree may then be forced upward along the sides of the bowl 40 by centrifugal force. The mixing baffle 700 returns the puree to center of the vortex where it may be pulled back toward the knives. Because the vertical cutter mixer 12 operates at a very high speed, it produces a creamy, homogeneous puree.

Figure 7:
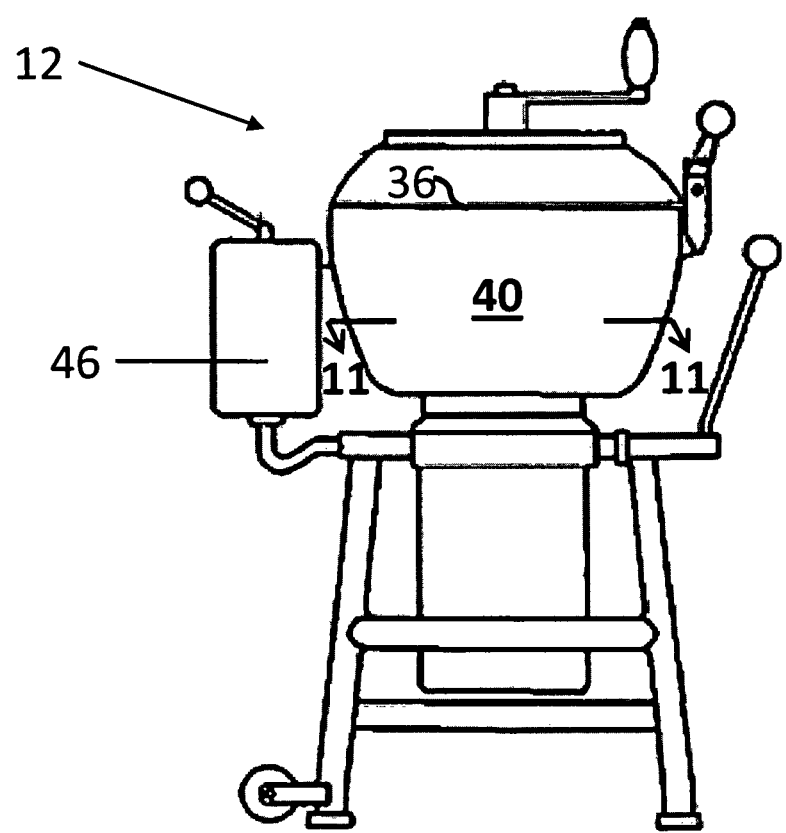
FIG. 7 depicts the mixing device depicted in FIG. 6, after sealing the lid of the mixing device and reducing the pressure inside the mixing bowl to less than one atmosphere, in accordance with embodiments of the present invention.

FIG. 7 depicts the mixing device 12 shown in FIGS. 4-6, except the lid 30 has been closed, in the direction of arrow 37, forming a seal 36, so the pressure in the mixing bowl 40 may be reduced to less than one atmosphere of pressure.

FIG. 8 depicts a scraped surface heat exchanger 34. The scraped surface heat exchanger 34 consists of a smooth inner cylinder 56 through which banana puree may be pumped, and a surrounding jacket 62, through which a refrigerant medium 60 may be pumped. The puree may be ambient temperature at the input 58 and may be reduced to an appropriate semi-frozen state at the output 35 of the heat exchanger 34. Duration in the cylinder 56 may be implementation specific but typically less than 30 seconds. Rotating scraper blades 64, referred to as dashers, continuously scrape frozen puree from the inner wall of the smooth cylinder 56. The continual harvesting of ice crystals by the dasher 64 prevents the formation of large ice crystals in the frozen puree. The dasher blades 64 are fixed to a rotating shaft 66.

FIG. 9 depicts an industrial freezing unit 24. In an embodiment of the methods 100, 113, and 141, the puree may be passed through the heat exchanger to a doser 14, depicted in FIG. 4. The oxidation-resistant puree may then be dosed into individual molds 13, depicted in FIG. 4. Sticks 18 may then be inserted into the molded semi-frozen puree, and the dosed molds 22 are then put into an industrial freezing unit 24, such as an immersion freezer. Immersion freezers either linear or rotary, and batch or continuous, are compatible with this method. Aggregation of individual molds 13 in the form of basket molds 16 is appropriate for linear immersion freezers. Other means of aggregation, such as rotary mold tables, may be appropriate for rotary immersion freezers. The temperature of the dosed molds 22 are lowered within the freezing unit 24 to below 0° F. in order to convert the puree into a solidified core 26 with a predetermined volume, shape, and weight. The dosed molds 22 are then briefly warmed in some manner, such as being placed into a warm bath 28. This allows the solidified cores 26 to be extracted from the basket molds 16.

In one embodiment, individual molds 13 are aggregated in the form of a basket mold 16 comprised of a tray 11, having vertical side walls 9 and a bottom 207, wherein the bottom 207 has an opening into a fill area 205 of at least one banana-shaped mold. 13. An exploded view of the opening into a fill area 205 of a banana-shaped mold 13 is depicted in FIG. 12, infra.

FIG. 10 depicts a molten coating 30. In an embodiment of the methods 100, 113, and 141, the solidified cores 26 are extracted from the molds 13, and are then dipped in a molten coating 30, such as chocolate, and topped with edible bits, 32, if desired.

FIG. 11 depicts an axial cross-sectional view of the mixing bowl 40 of the mixing device 12 taken along the line 11-11 in FIGS. 4, 5, 6, and 7. The impeller 42 in the mixing bowl 40 of the mixing device 12 functions as a pump that delivers a certain volumetric rate at each rotational speed and corresponding power input. The power input may be influenced also by the geometry of the equipment and the properties of the puree. The flow pattern and the degree of turbulence are key aspects of the texture, creaminess and mouthfeel of the puree. Basic impeller actions are either axial or radial, but, depicted in FIG. 11, radial action of the impeller results in some axial movement of the puree in the direction of the arrows 710, 720, by reason of deflection from the vessel walls and baffles 700. Baffles 700 contribute to turbulence by preventing swirl of the puree contents as a whole and elimination of vortexes. The baffles 700 may be stationary or radially rotatable using handle 31, as depicted in FIG. 6, and described in associated text herein.

Figure 12:
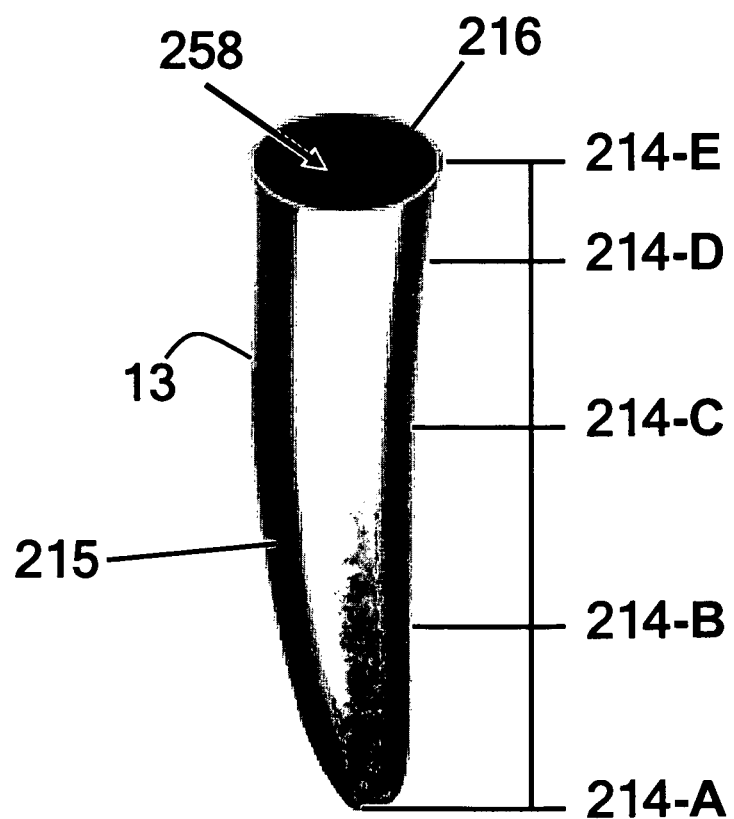
FIG. 12 depicts an exploded elevation view of a banana-shaped mold depicted in FIG. 9, in accordance with embodiments of the present invention.

FIG. 12 depicts an exploded elevation view of the banana-shaped mold 13, depicted in FIG. 9, and described in associated text, herein, wherein tapered walls 215 of the mold 13 may form a fill area 258 that extends from the open end 216 to the other end of the mold 13, wherein the other end of the mold 13 may be closed, wherein the open end 216 of the mold 13 may have the widest cross-section of the mold 13.

In an embodiment, a length of the banana-shaped mold 13 from bottom 214-A to top 214-E may be less than or equal to 1-54 mm.

In an embodiment, a length of the banana-shaped mold 13 from bottom 214-A to 214-D represents an optimal fill height of the mold 13. This may be less than or equal to 134 mm.

In an embodiment, an inner diameter of the fill area 258 at height 214-D may be less than or equal to 39 mm.

In an embodiment, the inner diameter of the fill area 258 at height 214-C may be less than or equal to 33 mm.

In an embodiment, the inner diameter of the fill area 258 at height 214-B may be less than or equal to 28 mm.

In an embodiment, a shape of the banana-shaped mold 13 may have tapered walls 215, so the shape widens from bottom to top of the fill area 258, so the solidified core 26 may be easily extracted.

In an embodiment, a curvature from top 214-E to bottom 214-A of the banana-shaped mold 13 may be very slight, e.g., a bend of from about 10 mm to about 20 mm per 10 cm of length.

In one embodiment, the mold 13 may be made from a material of construction that is approved for food contact, and may be stainless steel.

In one embodiment, a thickness of the tapered wall 215 of the mold 13 may be less than or equal to 0.5 mm.

In one embodiment, the mold 13 may be advantageously seamless because seams can harbor bacteria growth.

Banana-shaped molds 13 may be aggregated into basket molds 16 and mold trays 11, depicted in FIG. 9, and described in associated text, herein, for use with commercially available linear stick novelty manufacturing machines. Alternatively, the banana-shaped mold 13, depicted in FIG. 12, and described in associated text, may be aggregated into rotary tray tables as appropriate for rotary novelty manufacturing machines.

While the invention has been disclosed in connection with the embodiments depicted herein, it will be apparent to one of ordinary skill in the art that various modifications and substitutions may be made to these embodiments without departing in any way from the scope of the invention as defined in the following claims.

I claim:

1. A method for making frozen food products, comprising:
    creating a puree comprising banana meat, an antioxidant and a stabilizer by mixing at room temperature and next reducing the temperature of the oxidation-resistant puree by passing the oxidation-resistant puree through a scraped surface heat exchanger,
        wherein the banana meat has not become meal through a de-watering process,
        wherein the heat exchanger cools the puree to a workable temperature range for making molded or extruded products in which the resulting ice crystal size is roughly the diameter of a banana cell or less, resulting in a creamy texture and a creamy mouthfeel, the cooled puree being a semi-frozen puree, and
        wherein the workable temperature range for molding the puree is from 12° F. to 22° F., and the workable temperature range for extruding the puree is from 0° F. to 12° F.; and
    filling a mold with the semi-frozen puree or extruding the semi-frozen puree,
        wherein the temperature of the semi-frozen puree is maintained within the workable temperature ranges until and during the filling or extruding steps.

2. The method of claim 1, wherein the antioxidant is an organic acid.

3. The method of claim 1, wherein the antioxidant is selected from the group consisting of citric acid, ascorbic acid, lemon juice, and lime juice.

4. The method of claim 1, comprising an extruder after the scraped surface heat exchanger, wherein the temperature of the puree at the exit end of the heat exchanger is reduced to between 0° F. and 5° F.

5. The method of claim 1, wherein the banana meat in the puree is greater than or equal to 50 percent by weight of the puree.

6. The method of claim 1, wherein the banana meat, antioxidant and stabilizer are mixed under less than one atmosphere of pressure.

7. The method of claim 1, comprising inserting sticks into the semi-frozen puree.

8. The method of claim 1, comprising transferring the filled molds into an industrial freezing unit, wherein the temperature of the semi-frozen puree is maintained within the workable temperature range for molding, and lowering the temperature of the molded puree to below 0° F., converting the molded semi-frozen puree into a solidified frozen food product having a pre-determined volume, shape, and weight determined by the filled mold.

9. The method of claim 8, comprising warming the filled molds, thus allowing the solidified cores to be extracted from the molds.

10. The method of claim 9, comprising dipping the solidified cores into a molten coating, after extracting the solidified cores from the mold.

11. The method of claim 1, comprising maintaining the workable temperature range for filling the mold or extruding the semi-frozen puree by recirculating the oxidation-resistant puree through the heat exchanger.

12. The method of claim 1, wherein the stabilizer is selected from the group consisting of gelatin, egg white, guar gum, locust bean gum, tara gum, xanthan gum, sodium alginate, propylene glycol alginate (PGA), carrageenan, CMC, and microcrystalline cellulose (MCC).

13. The method of claim 1, comprising:
    conveying the semi-frozen or semi-solid oxidation-resistant puree into an extruder and extruding the semi-frozen oxidation resistant puree out of the extruder.

14. The method of claim 13, comprising shaping the extruded puree into individual portions resembling bonbons or banana slices.

15. The method of claim 14 wherein the individual portions are enrobed in a molten coating.

16. The method of claim 14, comprising packaging and boxing the portions.

17. The method of claim 1, wherein the oxidation-resistant puree is recirculated through the heat exchanger, maintaining the the workable temperature range for making molded or extruded products.

18. The method of claim 1,
    wherein the mold is a banana-shaped mold,
    wherein, walls of the mold form an inwardly tapered and curved fill area that extends from the open end to the other end of the mold,
    wherein the other end of the mold is closed, and wherein the open end of the mold has the widest cross-section of the mold.

19. The method of claim 18, wherein the mold (13) has a fill area (258), and wherein a length of the fill area (258) of the mold (13) from (214A) to top (214E) is less than or equal to 154 mm.

20. The method of claim 19, wherein a fill height of the fill area (258) of the mold (13) from bottom (214A) to fill height (214D) is less than or equal to 134 mm.

21. The method of claim 19, wherein an inner diameter of the fill area (258) of the mold (13) at a fill height (214D) is less than or equal to 39 mm.

22. The method of claim 19, wherein an inner diameter of the mold (13) at a fill height (214C) is less than or equal to 33 mm.

23. The method of claim 19, wherein an inner diameter of the fill area (258) of the mold (13) at a fill height (214B) is less than or equal to 28 mm.

24. The method of claim 18, wherein a shape of the banana-shaped mold is tapered so the shape widens from bottom to top of the banana-shaped mold, so the solidified core may be easily extracted from the fill area of the mold.

25. The method of claim 18, wherein a bend of a curvature from the top to the bottom of the banana-shaped mold is from 10 mm to 20 mm per 10 cm of length.

26. The method of claim 18, wherein the material of construction of the banana-shaped mold is approved for food contact, and is stainless steel.

27. The method of claim 26, wherein a thickness of a stainless steel wall of the mold is less than or equal to 0.5 mm.

28. The method of claim 18, wherein the mold is seamless to prevent bacterial growth.

29. The method of claim 7, wherein the sticks are selected from the group consisting of lollipop sticks and popsicle sticks.

30. The method of claim 10 wherein the molten coating is chocolate flavored.

* * * * *